United States Patent [19]

Naarmann et al.

[11] 4,404,359
[45] Sep. 13, 1983

[54] PREPARATION OF POLYPHENYLENE ETHERS

[75] Inventors: Herbert Naarmann, Wattenheim; Juergen Hambrecht, Heidelberg; Norbert Rieber, Mannheim, all of Fed. Rep. of Germany

[73] Assignee: BASF Aktiengesellschaft, Fed. Rep. of Germany

[21] Appl. No.: 399,211

[22] Filed: Jul. 19, 1982

[30] Foreign Application Priority Data

Jul. 23, 1981 [DE] Fed. Rep. of Germany ....... 3129083

[51] Int. Cl.$^3$ .............................................. C08G 65/44
[52] U.S. Cl. ..................................... 528/216; 528/212
[58] Field of Search ................ 528/212, 215, 216, 218

[56] References Cited

U.S. PATENT DOCUMENTS

| 3,219,625 | 11/1965 | Blanchard et al. | 260/47 |
| 3,306,874 | 2/1967 | Hay | 528/216 |
| 3,306,875 | 2/1967 | Hay | 528/216 |
| 3,344,116 | 9/1967 | Borman | 528/216 |
| 3,378,505 | 4/1968 | Hay | 260/2.1 |
| 3,491,058 | 1/1970 | Taylor et al. | 528/216 |
| 3,661,848 | 5/1972 | Cooper et al. | 260/47 ET |
| 3,787,362 | 1/1974 | Bennett et al. | 528/216 |
| 3,796,689 | 3/1974 | Bennett et al. | 528/216 |
| 4,024,107 | 5/1977 | Bennett et al. | 528/216 |

Primary Examiner—Lester L. Lee
Attorney, Agent, or Firm—Keil & Witherspoon

[57] ABSTRACT

A process for the preparation of high molecular weight polyphenylene ethers from monohydric phenols which have alkyl substituents in both ortho-positions and may additionally have an alkyl substituent in one meta-position but not in the para-position, by an oxidative coupling reaction, employing oxygen, at from 10° to 25° C., in the presence of a catalyst complex comprising a copper salt and an N-substituted imidazole, in the presence of an aromatic $C_8$-$C_{10}$-hydrocarbon solvent.

N-Methylimidazole, N-ethylimidazole, N-isopropylimidazole, N-n-butylimidazole, N-cyclohexylimidazole, N-octylimidazole and N-phenylimidazole are preferably used as the imidazole, advantageously in amounts of from 0.5 to 5 percent by weight.

2 Claims, No Drawings

PREPARATION OF POLYPHENYLENE ETHERS

The present invention relates to a process for the preparation of high molecular weight polyphenylene ethers from monohydric phenols which have alkyl substituents in both ortho-positions and may additionally have an alkyl substituent in one meta-position but not in the para-position, by an oxidative coupling reaction, employing oxygen, at from 10° to 25° C., in the presence of a catalyst complex comprising a copper salt and an organic amine, in the presence of from 1 to 20 parts by weight of an aromatic $C_8$–$C_{10}$-hydrocarbon solvent per part by weight of the monomeric phenol, and in the presence or absence of an activator.

In such processes for the self-condensation of monohydric phenols by the action of oxygen, catalyst systems which, in the presence of a solvent, initiate the oxidative coupling reaction are required.

It has been proposed that in order to meet these requirements in the case of aromatic solvents, such as $C_8$–$C_{10}$-hydrocarbons, the reaction be carried out in the presence of a catalyst complex comprising a copper(II) salt and a straight-chain aliphatic amine or a cyclic amine (cf. European Patent Application Ser. No. 81/106,610). After completion of the reaction, about a 10-fold amount of methanol is added to the aromatic solution containing the polymer, and the precipitated polymer is filtered off, washed with methanol and dried under reduced pressure at 70° C.

This prior art method has the disadvantage that excessively long reaction times are required for the oxidative polycondensation during the preparation of relatively high molecular weight polycondensates.

It is an object of the present invention to obtain polymers which have comparatively high intrinsic viscosities, in a relatively short reaction time and with the use of crude monomers, by modifying the amine component in the catalyst.

We have found that this object is achieved, according to the invention, by using as the amine an N-substituted imidazole, preferably N-methylimidazole, N-ethylimidazole, N-isopropylimidazole, N-n-butylimidazole, N-cyclohexylimidazole, N-octylimidazole or N-phenylimidazole. In a particularly preferred procedure, from 0.5 to 5 percent by weight, based on the monomeric phenol, of the N-substituted imidazole is used.

For the purposes of the invention, high molecular weight polyphenylene ethers are products obtained by oxidative coupling of 2,6-dialkylphenols and comprising a chain of alkyl-substituted benzene rings linked in the para-position by oxygen atoms constituting ether bonds. The polymers have molecular weights of from 5,000 to 30,000, preferably from 10,000 to 25,000, determined by the method described in "Macromolecular Syntheses" 1 (1978), 83. High molecular weight polyphenylene ethers, also referred to as poly(phenylene oxides), have been known per se from the literature for a considerable time (cf. for example, U.S. Pat. Nos. 3,661,848, 3,219,625 and 3,378,505), so that a further description is not necessary here.

The monohydric phenols which are used for the preparation of the high molecular weight polyphenylene ethers and which have alkyl substituents in both orthopositions but not in the para-position are conventional phenols such as 2,6-dimethylphenol, 2,6-diethylphenol, 2-methyl-6-ethylphenol, 2-methyl-6-propylphenol, 2,6-di-butylphenol and 2,3,6-trimethylphenol, as well as mixtures of these.

Polycondensation is usually carried out by passing oxygen into a solution of the monomer, at 10°–25° C., preferably 15°–20° C., in the presence of a catalyst complex. The oxygen flow rate is substantially the same as described in U.S. Pat. Nos. 3,306,874 and 3,306,875.

The catalyst complex conventionally used for the polycondensation is a combination of an amine, for example dibutylamine, diethylamine, picoline, quinoline, a pyridine base, triisopropylamine, dimethylisopropanolamine, triethanolamine, triisopropanolamine or diisopropanolamine, with a copper salt, eg. copper(I) bromide, copper(I) chloride, copper(I) iodide, copper(II) acetate, copper(II) propionate, copper(II) ethyl acetoacetate and copper(II) acetylacetonate. The amount of amine employed is preferably from 2.0 to 25.0 moles per 100 moles of the monomer, but the concentration of the amine in the reaction mixture can vary within wide limits, though low concentrations are advantageous. The concentration of the copper salt is kept low, and preferably varies from 0.2 to 2.5 moles per 100 moles of the monomer.

The ratio of solvent to monomer is usually from 1:1 to 20:1, ie. not more than a 20-fold excess of solvent over monomer. In the process according to the present application, an aromatic $C_8$–$C_{10}$-hydrocarbon is used as the solvent. Suitable hydrocarbons are, in particular, ethylbenzene, xylene and diethylbenzene, and mixtures of these, ethylbenzene being preferred. From 1 to 10 parts by weight of the solvent are employed per part by weight of monomeric phenol.

In addition, the reaction mixture can contain an activator, such as a diarylguanadine or a diarylformamidine (cf. U.S. Pat. No. 3,544,515).

In the process according to the invention, the amine to be used is an N-substituted amidazole, preferably N-methylimidazole, N-ethylimidazole, N-isopropylimidazole, N-n-butylimidazole, N-cyclohexylimidazole, N-octylimidazole or N-phenylimidazole. The N-substituted imidazole is advantageously used in an amount of from 0.5 to 5, preferably from 0.8 to 1.5, percent by weight, based on the phenol employed.

The particular advantage achieved by means of the invention is that a polymer of high intrinsic viscosity is obtained when crude monomers are used. Using this polymerization method, the polymers are, in addition, obtained in yields of above 90 percent by weight, based on the monomer employed.

If, for example, a crude 2,6-dimethylphenol is employed under comparable conditions, ie. in solution in ethylbenzene, but with dibutylamine replaced by N-n-butylimidazole, the polymer obtained has an intrinsic viscosity $[\eta]$ of b 1.076 dl/g. In contrast, when ethylbenzene and dibutylamine are used, the maximum intrinsic viscosity $[\eta]$ is only 0.806 dl/g.

This behavior shows that the change to N-substituted imidazoles as the amine components is unexpectedly advantageous and permits the use of crude 2,6-dimethylphenol.

The Examples show that, in addition to the advantage, achieved according to the invention, of the higher intrinsic viscosity of the polymer, other advantages are the shorter polymerization time and the substantially smaller amount of impurities, such as tetramethyldiphenoquinone.

COMPARATIVE EXAMPLE

According to German Laid-Open Application DOS No. 3,033,813 Preparation of poly-(2,6-dimethyl-1,4-phenylene) ether 2 g of 2,6-dimethylphenol are added to 1.3 g of Cu(I) bromide and 33 g of dibutylamine, and the mixture is stirred for 5 minutes at 20° C., while oxygen is introduced. Thereafter, a solution of 204 g of 2,6-dimethylphenol in 1,400 ml of ethylbenzene is introduced in the course of 30 minutes, after which the mixture is stirred for a further hour at 20° C. The reaction is carried out in the presence of a stream of oxygen of 30 liters/hour.

After completion of the reaction, the polymer is precipitated with 10 l of methanol. The product obtained after drying has an intrinsic viscosity $[\eta]$ of 0.8 dl/g. The polymer yield is 90% (based on the monomer employed). Analysis: Cu content: 4 ppm, N content: 0.1% by weight.

EXAMPLE 1

If the procedure described above is followed, but dibutylamine is replaced by N-n-butylimidazole, the polymer obtained in the same total reaction time as that of the Comparative Example has an intrinsic viscosity $[\eta]$ of 1.076 dl/g.

| Example No. | Anhydrous Cu salt, g | | Solvent | Amine, type and amount in g | | dl/g $[\eta]$ |
|---|---|---|---|---|---|---|
| 2 | Cu(I) Br | 1.3 | ethylbenzene | N—methylimidazole | 20 | 1.032 |
| 3 | Cu(I) Br | 1.3 | xylene | " | 25 | 1.035 |
| 4 | Cu(I) Br | 1.3 | xylene | " | 30 | 1.042 |
| 5 | Cu(I) Br | 1.3 | xylene | " | 35 | 1.049 |
| 6 | Cu(I) Br | 1.3 | xylene | " | 40 | 1.055 |
| 7 | Cu(I) Cl | 1.3 | ethylbenzene | N—ethylimidazole | 30 | 1.062 |
| 8 | Cu(I) I | 1.3 | ethylbenzene | " | 30 | 1.020 |
| 9 | Cu(I) Br | 2.6 | ethylbenzene | " | 30 | 1.072 |
| 10 | Cu(I) Br | 2.6 | ethylbenzene | N—n-butylimidazole | 40 | 1.079 |
| 11 | Cu(II) Br | 1.3 | ethylbenzene | " | 25 | 1.070 |
| 12 | Cu(II) acetate | 1.5 | ethylbenzene | N—isopropylimidazole | 25 | 1.010 |
| 13 | Cu(II) propionate | 1.5 | ethylbenzene | " | 25 | 1.001 |
| 14 | Cu(I) ethyl acetoacetate | 1.5 | ethylbenzene | N—cyclohexylimidazole | 25 | 0.931 |
| 15 | Cu(II) acetylacetonate | 1.5 | ethylbenzene | N—phenylimidazole | 25 | 0.725 |
| 16 | Cu(I) Br | 1.3 | ethylbenzene | N—octylimidazole | 33 | 1.025 |

In each experiment, the total reaction time is 1½ hours.

We claim:

1. A process for the preparation of a high molecular weight polyphenylene ether from a monohydric phenol which has alkyl substituents in both ortho-positions and may additionally have an alkyl substituent in one meta-position but not in the para-position, by an oxidative coupling reaction, employing oxygen, at from 10° to 25° C., in the presence of a catalyst complex comprising a copper salt and an organic amine, in the presence of from 1 to 20 parts by weight of an aromatic $C_8$-$C_{10}$-hydrocarbon solvent per part by weight of the monomeric phenol, and in the presence or absence of an activator, wherein the amine used is N-methylimidazole, N-ethylimidazole, N-isopropylimidazole, N-n-butylimidazole, N-cyclohexylimidazole, N-octylimidazole or N-phenylimidazole.

2. The process of claim 1, wherein the N-substituted imidazole is used in an amount of from 0.5 to 5 percent by weight, based on the phenol employed.

* * * * *